US008896461B2

(12) United States Patent
Angelis et al.

(10) Patent No.: US 8,896,461 B2
(45) Date of Patent: Nov. 25, 2014

(54) DISTRIBUTED METER DATA MANAGEMENT

(75) Inventors: Bruce Christopher Angelis, Valleyford, WA (US); James Alexander Papp, Cary, NC (US); Timothy James Driscoll, Raleigh, NC (US)

(73) Assignee: Itron, Inc., Liberty Lake, WA (US)

( * ) Notice: Subject to any disclaimer, the term of this patent is extended or adjusted under 35 U.S.C. 154(b) by 717 days.

(21) Appl. No.: 13/165,899

(22) Filed: Jun. 22, 2011

(65) Prior Publication Data

US 2012/0326883 A1 Dec. 27, 2012

(51) Int. Cl.
*G08B 23/00* (2006.01)
*G01D 4/00* (2006.01)
*H04Q 9/00* (2006.01)

(52) U.S. Cl.
CPC .............. *G01D 4/002* (2013.01); *Y04S 20/32* (2013.01); *H04Q 2209/60* (2013.01); *H04Q 2209/20* (2013.01); *H04Q 9/00* (2013.01); *Y02B 90/246* (2013.01); *Y04S 20/42* (2013.01); *Y02B 90/241* (2013.01)
USPC ................. 340/870.02; 340/903; 340/870.18

(58) Field of Classification Search
USPC .................. 340/870.02–870.05, 870.18, 903, 340/870.13
See application file for complete search history.

(56) References Cited

U.S. PATENT DOCUMENTS

| 8,504,668 | B2* | 8/2013 | Sudit ............................ 709/223 |
|---|---|---|---|
| 2004/0143420 | A1* | 7/2004 | Le Van Suu et al. .......... 702/188 |
| 2007/0211768 | A1* | 9/2007 | Cornwall et al. ............. 370/509 |
| 2008/0177678 | A1* | 7/2008 | Di Martini et al. ........... 705/412 |
| 2010/0217452 | A1* | 8/2010 | McCord et al. ............... 700/295 |
| 2011/0040666 | A1* | 2/2011 | Crabtree et al. ............... 705/37 |
| 2011/0063126 | A1 | 3/2011 | Kennedy et al. |
| 2012/0280831 | A1* | 11/2012 | Sfaelos .................... 340/870.02 |

OTHER PUBLICATIONS

Canadian Office Action mailed Feb. 9, 2012 for Canadian patent application No. 2754432, a counterpart foreign application of U.S. Appl. No. 13/165,899, 3 pages.

* cited by examiner

*Primary Examiner* — Daniel Previl
(74) *Attorney, Agent, or Firm* — Lee & Hayes, PLLC (57) ABSTRACT

In a distributed meter data management (MDM) system of a smart grid, a network computing device, such as a network router deployed in the field, may receive data from one or more utility meters, sensors, control devices, or other utility data collection devices that are communicatively coupled to the network computing device. The network computing device may process the data received from the utility data collection devices to generate processed data usable by a consumer. The network computing device may also send data to and/or receive data from a centralized control system, MDM system, and/or smart grid analytic applications at a utility central office. The network computing device may then provide the processed data directly to the consumer, with or without first sending the data to a centralized MDM system of the utility.

22 Claims, 6 Drawing Sheets

DISTRIBUTED METER DATA MANAGEMENT

BACKGROUND

Traditional meter data management (MDM) systems employ a centralized processing model, in which raw data from one or more utility meters, sensors, and/or control devices (collectively "utility data collection devices") is sent to a meter data management system at a central office of a utility provider for processing. As the size and number of customers being serviced by the utility increases, so too do the processing and storage demands on the centralized MDM systems. These demands are likely to increase even more as new and different devices are added to the utility network to support the smart grid and all of the services that the smart grid enables. To meet these increased demands using the centralized MDM systems currently in place, utilities will have to make substantial investments in infrastructure to increase the computing power and storage capacity of the centralized MDM systems. These costs and complexities are multiplied by the need to provide redundancy and fault tolerance of utility network systems.

Furthermore, in today's information age, customers and partners expect data to be available immediately. Currently, however, raw meter data must be processed at the centralized MDM systems before being used for rate calculations, customer billing, customer feedback, and other end uses. Moreover, the data transmission times to and from the centralized MDM and the serialized processing of the data at the centralized MDM introduce data latency that precludes many real time uses of the processed data. The fact that the MDM systems are, by nature, designed to aggregate data and process the aggregated data in batches, only serves to exacerbate the latency and other problems with centralized MDM systems noted above.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Raw data collected from utility meters, sensors, and/or control devices (collectively "utility data collection devices") of an advanced metering infrastructure (AMI) has the potential to be inaccurate, incomplete, or otherwise deficient. Utilities have traditionally addressed the potential deficiency of the raw data by sending the raw data to a centralized meter data management (MDM) system at a central office of the utility for processing. However, as noted above, processing raw data at a centralized MDM system has a number of drawbacks, including performance limitations, cost and complexity of maintaining and scaling a centralized MDM system, and data latency.

This application describes a distributed meter data management system (DMDMS), in which some or all of the processing historically performed by a centralized MDM system is instead performed in the field by network computing devices. These network computing devices may be part of an advanced metering infrastructure (AMI) including hardware and/or software systems that measure, collect and analyze energy usage. The AMI enables two-way communications between a network of utility meters (e.g., electric, gas, and/or water meters), sensors (e.g., temperature sensors, weather stations, frequency sensors, etc.), control devices, routers, servers, relays, switches, and other network computing devices. Any or all of these network computing devices may be used to process raw data that was historically processed by a centralized MDM system.

In one example, a network computing device, such as a network router (sometimes referred to as a "smart grid router") deployed in a cellular relay in the field, may receive data from one or more utility meters, sensors, control devices, or other utility data collection devices that are communicatively coupled to the network computing device. The network computing device may process the data received from the utility data collection devices to generate processed data usable by a consumer of the data, such as a customer, partner, supplier, third party, or internal system of the utility. The network computing device may then provide the processed data directly to the consumer, without first having to send the data to a centralized MDM system of the utility.

In some instances, network computing devices may perform a subset of the data processing operations that were traditionally performed by a centralized MDM system. In that case, the distributed network computing devices may also send the processed data and/or raw data to a centralized MDM system for further processing, analysis, storage, or management. However, in other instances, a centralized MDM system may be eliminated entirely. In that case, the data processing operations that were traditionally performed by a centralized MDM system may be performed by the network computing devices alone or in combination with one or more other network resources. For example, while long term storage of data could be performed by the network computing devices, other storage resources (e.g., data stores or warehouses) may be more suitable for long term storage of raw and/or processed data.

Examples of the types of data processing that the network computing devices may perform include, without limitation, validation of the quality of the data (e.g., checking that the data is within expected ranges), estimation of any missing data values (e.g., by comparison to historical data and/or by interpolation between adjacent data points), aggregation of data from multiple utility data collection devices (e.g., aggregate demand on a particular transformer), rate calculations based on the data or the aggregated data, and/or local event detection (e.g., detection of outages, tampering, momentary blinks, surges, weather events, etc.). Further examples include preparation of the data for delivery to one or more consumers of the data (e.g., formatting, conversion, etc.), billing calculations associated with the data (e.g., generation of an up-to-the-minute billing statement for a consumer), and/or configuring the data for storage in one or more data stores communicatively coupled to the network computing devices (e.g., compression, archival, etc.). The foregoing are just some of the many processing operations that may be performed by the network computing devices.

Any or all of these data processing operations can be performed on-demand as the data is received and processed data can be provided to consumer of the data. Because the processed data need not be sent to the central office prior to being provided to consumers, the processed data can be provided with minimal latency. In some instances, the processed data may be provided in real-time or substantially real-time.

The DMDMS described herein reduces data latency relative to traditional centralized MDM systems, since the processed data is sent directly from the network computing device to the consumer of the processed data, rather than having to make a round trip to the centralized MDM system and back. The reduction in latency enables new use scenarios that have not previously been feasible. For example, reduced latency allows utilities to use pricing to drive consumer consumption habits, since consumers will be able to use the processed data to change their normal consumption patterns to take advantage of lower prices.

Due to the distributed nature of the processing, the DMDMS has built in redundancy. This is in contrast to a centralized MDM system in which additional "backup" servers are needed for redundancy and fault tolerance. Thus, unlike a failed server in a centralized MDM system, processing responsibilities of a failed network computing device can readily be transferred to one or more other network computing devices with minimal additional demand on the network.

Moreover, the distributed network computing devices form a cloud of computing resources that can be used for, not only processing raw data from utility data collection devices, but any computations of a utility network service provider. The workloads of the various network computing devices can be managed to take advantage of idle computing resources. For example, if a first network computing device is idle while a second network computing device has a large backlog, data may be moved from the second network computing device to the first network computing device for faster processing. As another example, if a network computing device is idle, other computations from the central office (e.g., analysis of data, trending, billing, customer care, etc.) may be routed to the idle network computing device for completion. Additionally, in some embodiments, workload may be balanced between and among the network computing devices and the central office computing resources as well.

The DMDMS described herein scales automatically, since routers and other network computing devices will be added as the utility grid is built out (i.e., as equipment is upgraded and/or as new utility customers are added). Furthermore, since the DMDMS performs functions that were traditionally performed by servers at a central office of a utility, implementing a DMDMS may substantially reduce the cost and complexity of the computing infrastructure (e.g., servers, storage, and networking components) at the utility central office.

Multiple and varied implementations and embodiments are described below. The following section describes an example system that is suitable for implementing distributed meter data management. The following sections describe examples of distributed meter data management techniques. However, these examples are merely illustrative, and other systems and techniques may be used to implement distributed meter data management without departing from the scope of the claims.

Example Architecture

Figure 1:
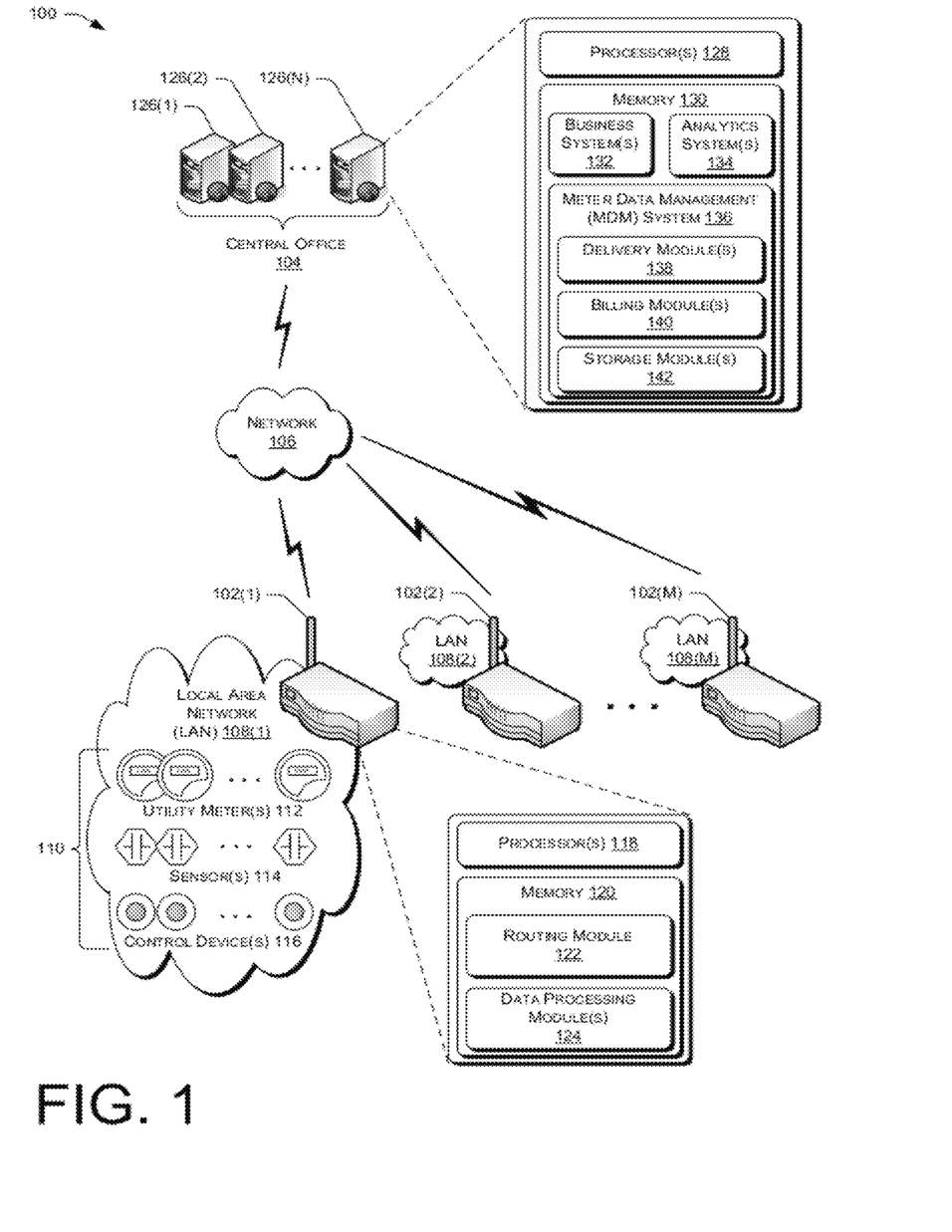
FIG. 1 is a schematic diagram of an example architecture usable to implement distributed meter data management, in which network computing devices perform at least some processing of raw data from utility data collection devices. The network computing devices may then provide the processed data directly to consumers of the processed data. The network computing devices may also provide the processed data and/or raw data to a centralized meter data management (MDM) system at a central office of a utility for further processing, analysis, storage, or other management. The distributed processing enables energy users to use real time information from the network devices along with analytical information from central office analytical processes.

FIG. 1 is a schematic diagram of an example architecture 100 usable to implement distributed meter data management. The architecture 100 includes a plurality of network computing devices 102(1), 102(2), . . . 102(M) (collectively referred to as 102) communicatively coupled to a central office 104 of a utility via a network 106. The network computing devices 102 perform at least some processing of raw data from utility data collection devices that was historically performed by a centralized MDM system at a central office of a utility. Having processed the data, the network computing devices 102 may then provide the processed data directly to consumers of the processed data.

Each of the network computing devices 102 may be implemented as any one of a variety of conventional computing devices such as, for example, smart utility meters (e.g., electric, gas, and/or water meters equipped with two-way communications), sensors (e.g., temperature sensors, weather stations, frequency sensors, etc.), control devices, regulators, routers, servers, relays, switches, valves, or a combination thereof. In one specific example, referred to throughout this application, the network computing devices 102 comprise network routers, sometimes referred to as a "smart grid router," disposed at a cellular relay station (e.g., atop a utility pole). The network computing devices 102 forms part of a local area network (LAN) 108 along with one or more utility data collection devices 110. In the example of FIG. 1, network computing devices 102(1), 102(2), and 102(M), form part of LANs 108(1), 108(2), and 108(M), respectively. While in this example, the number of network computing devices 102 and LANs 108 are the same, in other examples, the numbers of network computing devices 102 and LANs 108 may differ (e.g., if multiple network computing devices participate in a single LAN and/or if LANs exist that do not include network computing devices). By way of example and not limitation, utility data collection devices 110 may include utility meters 112 (e.g., water, gas, and/or electric meters), sensors 114, and/or control devices 116. The network computing devices 102 may be in one- or two-way communication with the utility data collection devices 110 via their respective LANs 108. Each LAN 108 may include any number of network computing devices 102 and utility data collection devices 110. For example, each LAN 108 may include at least one network computing device 102 and hundreds or even thousands of utility data collection devices 110 for each network computing device 102. For ease of illustration, only LAN 108(1) is shown in detail. However, the other LANs 108 may likewise include any number of network computing devices 102 and utility data collection devices 110.

Network computing device 102(1) is representative of the network computing devices 102 and includes one or more processors 118 communicatively coupled to memory 120. Memory 120 stores one or more software or firmware modules, which are executable on the one or more processors 118 to implement various functionality. While the modules are described herein as being software or firmware executable on a processor, in other embodiments, any or all of the modules may be implemented in whole or in part by hardware (e.g., as an application specific integrated circuit, a specialized processing unit, etc.).

In the embodiment of FIG. 1, memory 120 includes a routing module 122 to route communications to and from the network communication device 102(1), and one or more distributed meter data management (MDM) processing modules 124 to process raw data from the utility data collection devices 110. The routing module 122 may also manage and distribute workload between and among the network communication devices 102 and/or the central office 104. The network computing devices 102 may then provide the processed data directly to consumers of the processed data, prior to, after, or in lieu of sending the data or the processed data the central office 104 of the utility. Additional details of the distributed MDM processing module(s) 124 are provided below with reference to FIG. 3. Because the network computing devices 102 process the raw data for their respective LANs in parallel, the DMDMS scales naturally as additional network computing devices 102 are added to support additional utility data collection devices 110 that are added to support new customers of the utility. Also, because the network computing devices 102 process the data on demand as it is received and do not wait to process the raw data in batch, data latency is minimized. Data latency is further minimized by the fact that the data does not have to make a round trip to the central office 104 and back before being provided to the consumer. Data latency is further minimized because the network computing devices 102 are located in the field, proximate to the utility data collection devices 110 and at least some consumers of the data (e.g., customers of the utility). Still further reductions in data latency may be achieved by caching central office data at the network computing devices 102.

Additionally, the network computing devices 102 act as a large, distributed computing resource comprised of multiple relatively inexpensive computing devices (i.e., a cloud computing resource). In some implementations, this cloud computing resource can be leveraged to perform computations other than simply processing raw meter data. For example, the cloud of network computing devices 102 may be used to perform any or all of the processing traditionally performed at a utility central office 104. Thus, in some implementations, the cloud of network computing devices 102 may replace all or part of the computing resources at the utility central office 104.

The central office 104 in this example includes, among other things, one or more servers 126(1), 126(2), . . . 126(N) (collectively 126) arranged in, for example, a cluster or as a server farm. Other server architectures may also be used to implement the central office 104. The servers 126 include one or more processors 128 communicatively coupled to memory 130. Memory 130 includes, among other things, one or more business systems 132 and analytics systems 134. The business system(s) 132 may include both customer facing systems (e.g., customer service, user account services, etc.) and internal facing services (e.g., accounting services, reporting services, etc.). The analytics system(s) 134, meanwhile, may include systems for monitoring and analyzing data to identify trends and events related to, for example, resource supply, resource consumption, resource costs, etc.

In this embodiment, the central office 104 includes a centralized meter data management (MDM) system 136, which performs further processing, analysis, storage, or management of the raw data or processed data received from the network computing devices 102. For example, the centralized MDM system 136 may be configured to perform data processing that is less time sensitive (e.g., trending and forecasting) and/or processing of data aggregated from multiple network computing devices (e.g., network computing devices 102(1)-102(M)). That is, the centralized MDM in this example primarily performs analytics and warehousing functions. The centralized MDM system 136 in this embodiment includes one or more delivery modules 138, billing modules 140, and storage modules 142, which are executable by the one or more processors 128. The delivery module(s) 138 prepares the data for delivery to one or more consumers of the data, the billing module(s) 140 performs billing calculations associated with the data, and the storage module(s) 142 configure the data for storage in one or more local and/or remote data stores in communication with the centralized MDM system 136. In other embodiments, the centralized MDM system 136 may include additional or alternative modules. In still other embodiments, such as the embodiment shown in FIG. 2, a centralized MDM system at the central office 104 may be eliminated entirely.

The network 106, meanwhile, may comprise a wireless or a wired network, or a combination thereof. The network 106 may be a collection of individual networks interconnected with each other and functioning as a single large network (e.g., the Internet or an intranet). Examples of such individual networks include, but are not limited to, Personal Area Networks (PANs), Home Area Networks (HANs), Local Area Networks (LANs), Wide Area Networks (WAN5), and Metropolitan Area Networks (MANs). Further, the individual networks may be wireless or wired networks, or a combination thereof.

Figure 2:
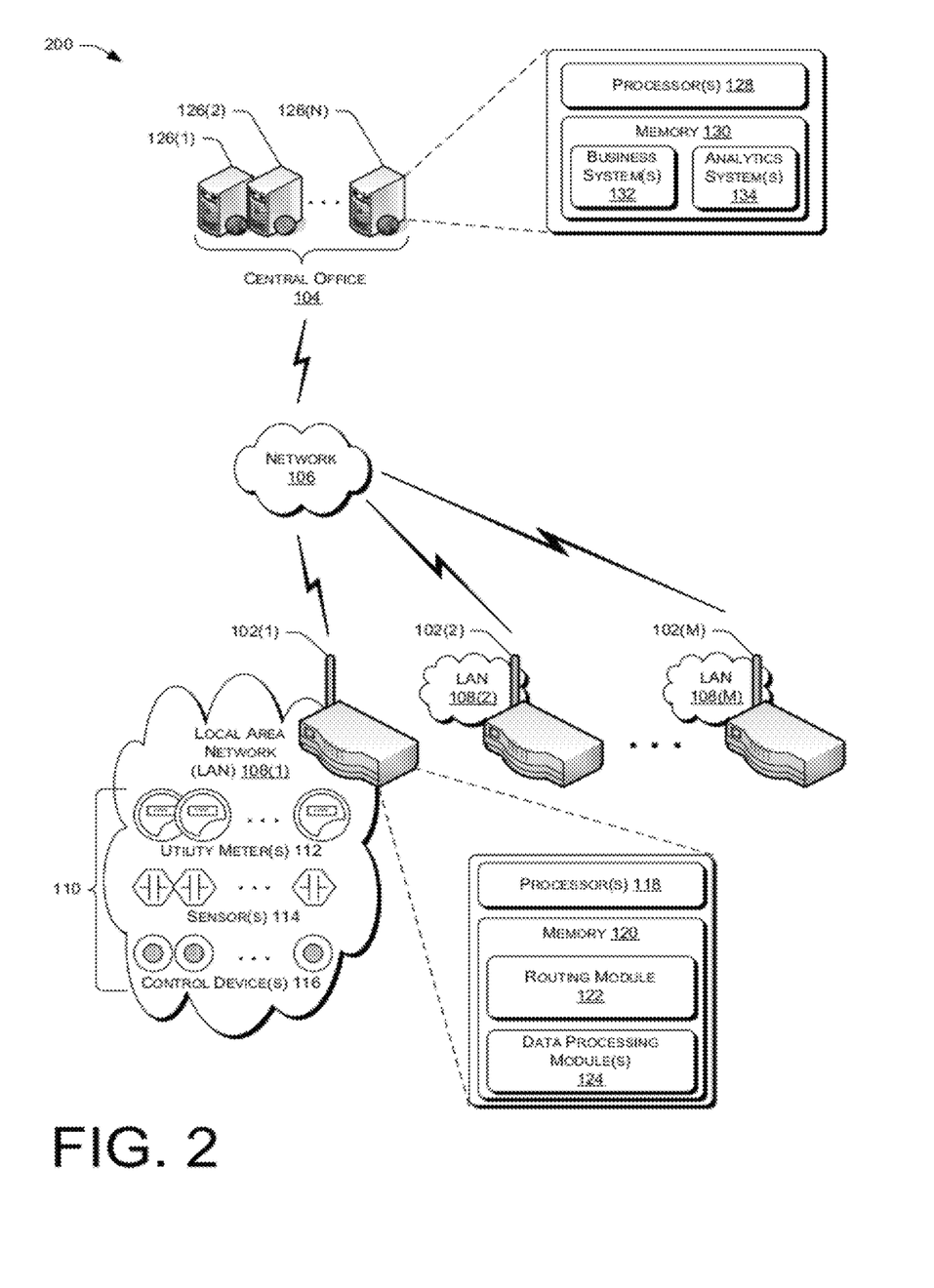
FIG. 2 is a schematic diagram of another example architecture usable to implement distributed meter data management, in which a centralized MDM system is eliminated, and network computing devices perform processing that was traditionally performed by the centralized MDM system.

FIG. 2 illustrates another example architecture 200 that may be used to implement distributed meter data management. In this example, a centralized MDM system at the central office 104 is omitted entirely. Instead, in this embodiment, the functions of the centralized MDM system 136 of FIG. 1 are performed by the distributed MDM processing modules 124 of the network computing devices 102 and/or other elements of the architecture 200. In all other respects, the architecture 200 is the same as that of architecture 100. For example, the network computing devices 102 are capable all of the processing, computations, and load balancing functions described with respect to FIG. 1. Therefore, a detailed discussion of the other components of the architecture 200 is omitted for the sake of brevity.

Example Network Computing Device with Distributed MDM Processing Modules

Figure 3:
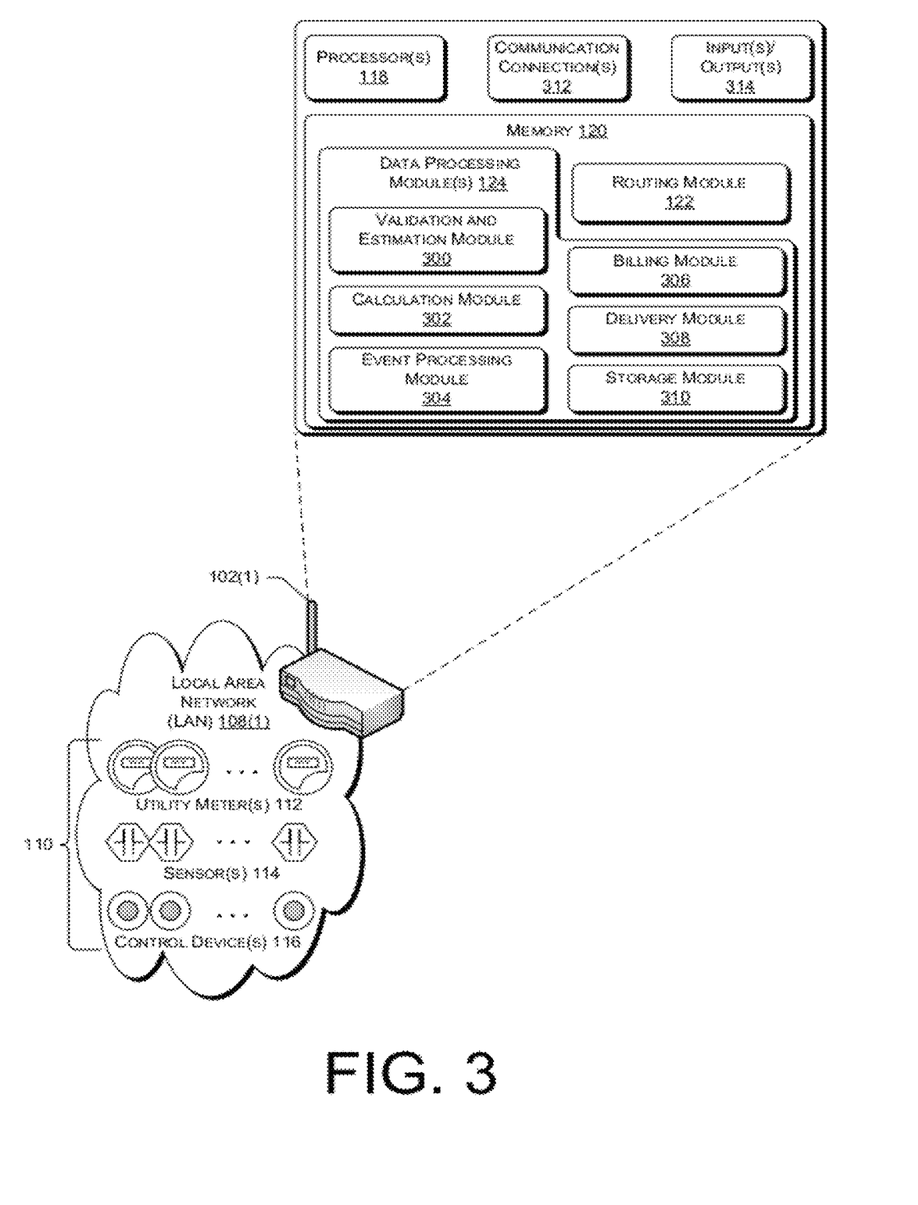
FIG. 3 is a schematic diagram showing additional details of one of the example network computing devices of FIG. 1, including data processing modules that may be included in the network computing device.

FIG. 3 is a schematic diagram showing additional details of one of the example network computing devices 102 of FIGS. 1 and/or 2, including specific examples of distributed MDM processing modules 124 that may be included in the network computing devices 102. The distributed MDM processing modules 124 in this example include a validation and estimation module 300, a calculation module 302, an event processing module 304, a billing module 306, a delivery module 308, and a storage module 310. The distributed MDM processing modules 124 are merely representative of the types of modules that may be included on network computing devices 102 to process raw data. In other embodiments, network communication devices may include any or all of these example modules or other data processing modules. For example, in the architecture of FIG. 1, the network computing devices 102 may only include the validation and estimation module 300, the calculation module 302, and the event processing module 304, while the functionality of the other modules shown in FIG. 3 are performed by the centralized MDM system 136 at the central office 104. As another example, in the architecture of FIG. 2, the network computing devices 102 may include all of the distributed MDM processing modules shown in FIG. 3 and a centralized MDM system may be dispensed with entirely.

In yet another example (not shown), network computing devices 102 of a DMDMS may include all of the distributed MDM processing modules shown in FIG. 3 and a centralized MDM system may include some or all of the same or corresponding modules. In that case, the centralized MDM 136 may serve as a backup or failover if the network computing devices 102 become overloaded or fail. Alternatively, processing loads may be split or balanced between the centralized MDM 136 and the distributed MDM modules 124 of the network computing devices 102. In that case, the allocation of processing responsibilities between the centralized MDM 136 and the network computing devices 102 may be based on the relative processing capabilities of the devices, current or predicted workloads of the devices, network bandwidth, network traffic, transmission latency between the devices, or the like.

Alternatively, part of a utility grid may be organized as a DMDMS (with network computing devices performing data processing for utility data collection devices in that part of the utility grid), while another part of the utility grid may employ a centralized MDM architecture (with a centralized MDM system performing data processing for utility data collection devices in that part of the utility grid). This may facilitate a gradual migration from a centralized MDM system architecture to a distributed MDM system architecture. Also, this approach may be usable to accommodate different utility data collection devices having different compatibilities.

Turning now to the specific examples of distributed MDM processing modules 124 shown in FIG. 3, the validation and estimation module 300 may validate the quality of the raw data received from one or more utility data collection devices 110 in communication with the network computing device 102. For example, the validation and estimation module 300 may check to see that received data is within expected ranges and report, flag, edit or ignore any data that is not within an expected range. Additionally or alternatively, the validation and estimation module 300 may estimate correct values for any missing or erroneous data values. Estimated values may be computed by, for example, referencing historical data and/ or by interpolation between adjacent data points using known validation and estimation techniques employed by centralized MDM systems. However, because the validation and estimation is performed at the network computing devices 102, the processed data may be provided directly to the consumer in a much more timely fashion than is possible using a centralized MDM system. By providing this processed data (sometimes referred to as "revenue quality data") in real-time or near real-time, consumers are able to alter their consumption behaviors based on current conditions as provided by the processed data. Such customer behaviors may be modified manually in response to the processed data, or may be modified according to predefined service agreements, user preferences, and/or rules governing consumption of resources under certain conditions.

The calculation module 302 may aggregate or assist in the aggregation of data from multiple utility data collection devices 110 (e.g., aggregate demand of all utility data collection devices in the LAN 108 corresponding to that particular network computing device 102, or total demand on a particular transformer). Based on this aggregate data, the network computing device 102 may, for example, actively manage resource consumption of particular consumers (e.g., defer running unnecessary or low priority operations during peak loads). The active management of resource consumption may be by suggestion of a course of action to a consumer, or by actual control of utilization (e.g., by control of individual appliances, but changing resource usage settings, or by controlling an amount of the resource provided). Additionally or alternatively, the calculation module 302 may perform rate calculations based on the raw data or the aggregated data. By providing this rate data to consumers in real-time or near real-time, consumers are able to see how much their resource consumption is costing them. Further, utilities can adjust utility prices in order to change consumer demand (e.g., to lower demand during times of peak usage and/or to encourage usage during periods of low demand).

The event processing module 304 may or assist in the processing of raw data to detect events effecting utility data collection devices 110 within the local LAN 108. For example, the event processing module 304 may include algorithms designed to detect utility outages, tampering, momentary blinks in service, surges, or the like. These algorithms may be the same or similar to those presently employed in a centralized MDM system. However, by performing the event processing at field-deployed network computing devices 102, network computing devices 102 are able to quickly detect events and take actions in response to the events. For example, upon detecting an event, the network computing device 102 may send a notification to the central office 104, the consumer, and/or one or more maintenance personnel. Additionally or alternatively, upon detection of an event, the network computing device may take one or more corrective actions. For example, if an outage is caused by a failed component, the network computing device 102 may take the failed component offline and connect an operational component in its place. As another example, when a resource is provided on a prepaid basis, the event processing module 304 may determine when a particular consumer exhausts a prepaid amount of the resource and may suspend service until the user purchases more of the resource. As yet another example, in the case of tampering, the network computing device 102 may send a warning to the consumer, send a notification to the central office 104, and/or may automatically suspend service to the consumer for a period of time.

The billing module 306 may perform billing calculations or assist in performing billing calculations associated with the received data. For example, the billing module 306 may generate an up-to-the-minute billing statement for a consumer. The delivery module 308 may prepare the data (e.g., format, convert, address, etc.) for delivery to one or more consumers of the data. As noted above, consumers of the data may include not only end customers of the utility, but also partners, suppliers, third parties (e.g., a host of a website), and internal systems of the utility. In one example, the delivery module may prepare the processed usage data, rate data, and billing data from the validation and estimation module 300, the calculation module 302, and the billing module 306, respectively, and deliver the processed data to the consumer. The processed data may be provided to the consumer periodically (e.g., daily, weekly, monthly, etc.) or on-demand (e.g., upon request of the consumer). In another example, the delivery module may prepare the processed data for transmission to one or more analytics programs of the central office 104 for analysis and/or trending.

The storage module 310 configures the raw and/or processed data for storage in one or more local and/or remote data stores communicatively coupled to the network computing devices 102. Configuring the data for storage may include compressing the data, encrypting the data, indexing the data, archiving the data, or the like. The data stores may comprise local memory of the network computing devices 102, storage located at the central office 104, and/or other network storage devices. Configuring the data for storage at the network communication devices 102 minimizes network traffic by allowing the DMDMS to transmit compressed data rather than raw data and by eliminating unnecessary transmissions of the data to and from a centralized MDM system at the central office 104. The data storage module 310 may further balance costs of local storage versus data transfer and communication costs when deciding where and how to store the raw and/or processed data.

In addition to the processor(s) 118, memory 120, and distributed MDM processing modules 124, the client device 104 may further include one or more communication connections 312 and one or more input(s)/output(s) 314. The communication connection(s) 312 allow the network computing device 102 to communicate with the utility data collection devices 110, the central office 104, and other computing devices over network 106, LANs 108, and other wired and/or wireless networks. The communication connection(s) 312 may include, for example, wide area, local area, home area, and/or personal area network connections. For example, the communication connection(s) 312 may include cellular network connection components, WiFi network connection components, Ethernet network connection components, Zigbee® network connection components, or the like. Depending on the type of network computing device 102, the input(s)/output(s) 314 may include, for example, a touch screen or other display, a keyboard, a mouse, a touch pad, a roller ball, a scroll wheel, buttons, indicator lights, an image capture device, an audio input device, an audio output device, and/or any other input or output devices.

Example Use Scenarios

Figure 4:
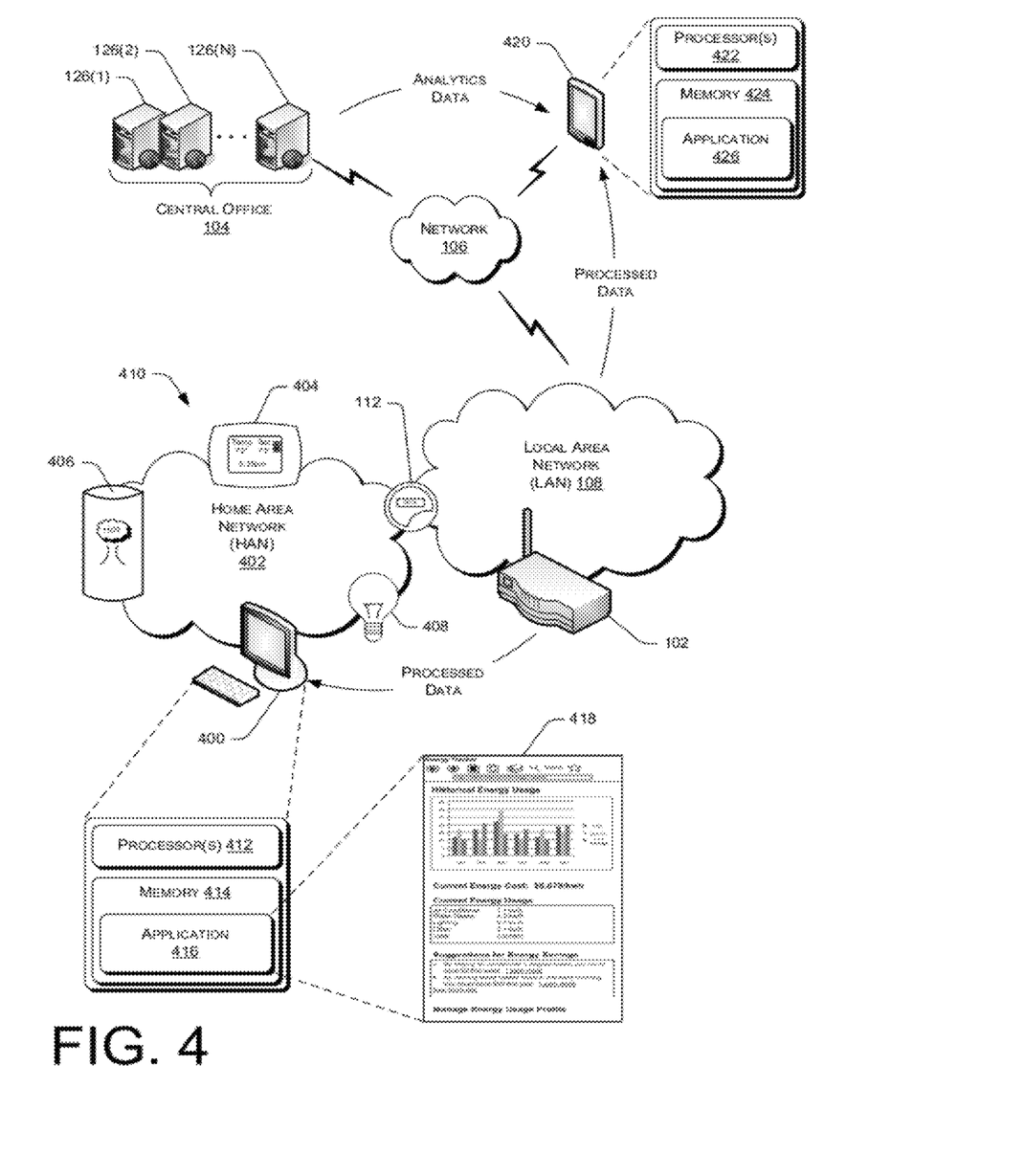
FIG. 4 is a schematic diagram showing an example of a use scenario enabled by the distributed meter data management system of FIG. 1, in which a network computing device provides processed data directly to a home area network of a utility meter in substantially real-time.
Figure 5:
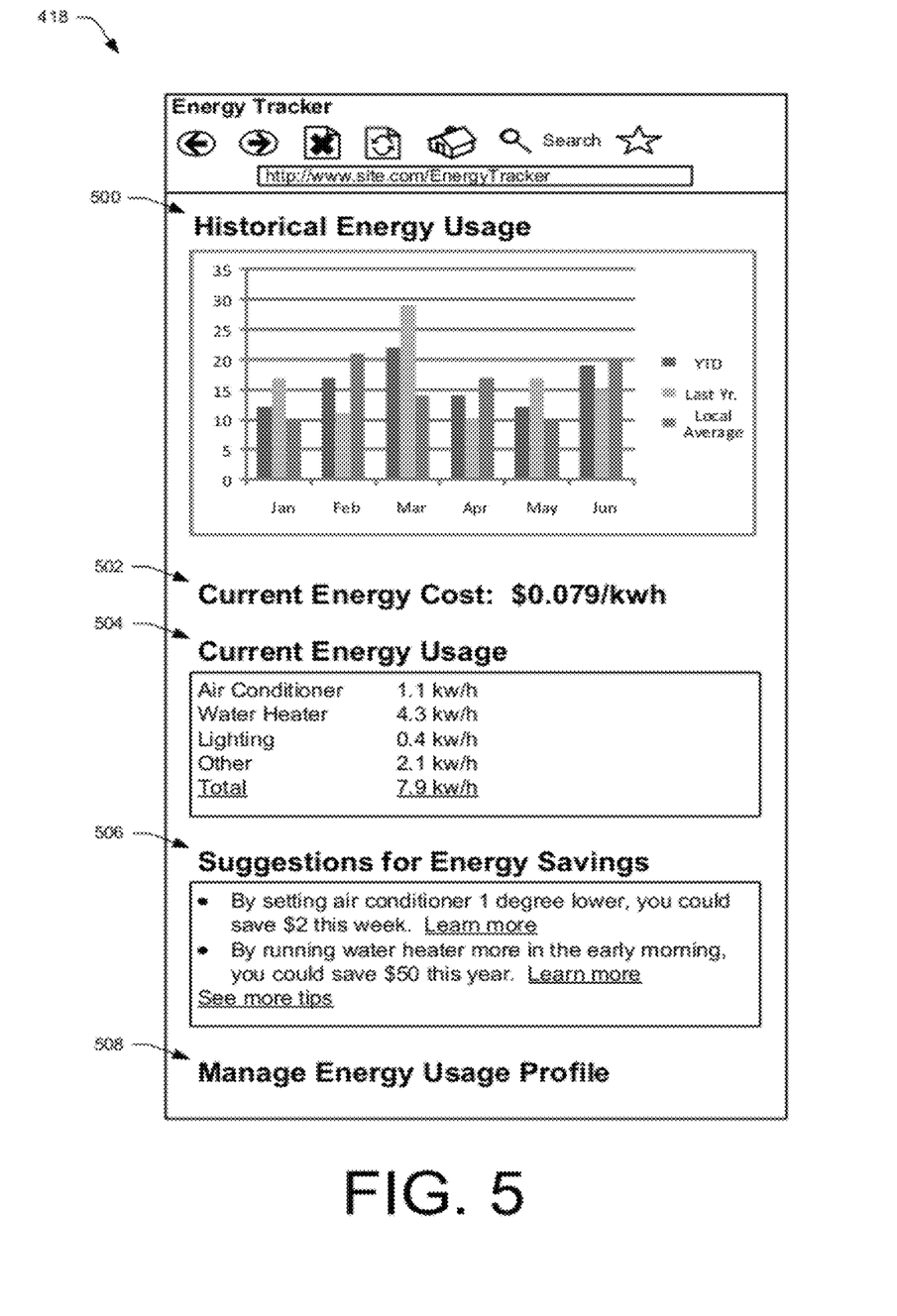
FIG. 5 is a screen shot of an example user interface that may be rendered on a client computing device according to the use scenario of FIG. 4.

FIGS. 4 and 5 illustrate an example use scenario made possible by a DMDMS, such as that shown in FIGS. 1-3. The use scenario is described with reference to the example architecture 100 of FIG. 1 for convenience. However, the use scenario is not limited to use with the example architecture 100 of FIG. 1 and may be implemented using other architectures and devices.

FIG. 4 illustrates an example in which raw data from one or more utility data collection devices is received and processed by a network computing device 102. The processed data is then transmitted directly to a consumer. In this example, the consumer is illustrated as a client computing device 400 of a customer of a utility. While the client computing device 400 in this embodiment is shown as a personal computer, processed data may be transmitted to any suitable client computing device. By way of example and not limitation, suitable client computing devices include mobile devices (cellular telephones, portable digital assistants, Smartphones, tablets, pad computing devices, etc.), smart appliances (e.g., thermostats, water heaters, washers, dryers, dishwashers, furnaces, air conditioners, televisions, etc.), routers, servers, controllers, automobiles, and the like.

In this example, a utility meter 112 disposed in the LAN 108 of the network computing device 102 is also part of a home area network (HAN) 402. A HAN is a network of computing devices that are in communication with one another via wired and/or wireless connection (e.g., via WiFi, Zigbee, Bluetooth, Ethernet, universal serial bus (USB), telephone line, cable television line, or the like). HANs are typically, though not necessarily, localized around a single home, business, or other structure. A HAN may be formed around a utility data connection device, such as a smart utility meter, and may include multiple other computing devices, such as the suitable client computing devices listed above. In the illustrated example, the HAN 402 includes, in addition to utility meter 112 and the client computing device 400, a thermostat 404, a water heater 406, and a lighting controller 408 (collectively "smart appliances" 410). Raw data collected by the utility meter 112 is transmitted to the network computing device 102 via the LAN 108 and the HAN 402. At the network computing device 102, the data is processed using any one or more of the data processing modules described herein or other data processing modules. The processed data is then transmitted directly to the client computing device 400 (again via the via the LAN 108 and the HAN 402). The processed data may be viewed using the client computing device 400 and/or may be used to control operation of the one or more smart appliances 410 in real-time or substantially real-time.

The client computing device 400 in this example includes one or more processors 412 and memory 414 storing, among other things, a one or more applications 416 usable to render a user interface 418 to present some or all of the processed data on a display of the client computing device 400. For example, the application(s) 416 may comprise a browser configured to render a user interface 418 including processed data served by the network computing device 102 or another computing device in communication therewith. In another example, the application 416 may comprise a dedicated client application for presenting the user interface 418 usable to view and manage processed data received from the network computing device 102.

The example of FIG. 4 also shows a second client computing device 420 which receives processed data from the network computing device 102 and/or analytics data from the central office 104. The second client computing device 420 may be a computing device of a utility customer, an employee or administrator of the utility, a supplier or vendor of the utility, for example. In the illustrated example, the second client computing device 420 is shown as a mobile device. However, the second client computing device may comprise any other suitable client computing device.

The second client computing device 420 in this example includes one or more processors 422 and memory 424 storing, among other things, a one or more applications 426 usable to render a user interface to present some or all of the processed data and or analytics data on a display of the client computing device 420. The application(s) 426 on the second client computing device 420 may comprise a browser configured to render a user interface including the processed data served by the network computing device 102, the central office 104, and/or another computing device in communication therewith. Alternatively, the application 426 may comprise a dedicated client application for presenting a user interface usable to view and manage processed data received from the network computing device 102. In one example the user interface rendered by application 426 of the second client computing device 420 may be the same as, or include some or all of the information as, the user interface 418 rendered by application 416 of the client device 400. In the illustrated example, the second client device 420 has access to analytics data from the central office 104 and may, therefore, present such analytics information in addition to or instead of the information shown in user interface 418. By way of example and not limitation, the user interface presented by the second client computing device 420 may include rolling averages of a particular user's consumption, comparisons of the particular user's consumption patterns to those of other similar users (e.g., having similar consumption patters, having similar home sizes, in similar geographical areas, experiencing similar weather patterns, etc.), or other information based at least in part on the analytics data from the central office 104.

FIG. 5 illustrates an example user interface 418 that may be rendered by application 416 on a display of client computing device 400 according to the use scenario described with reference to FIG. 4. Generally, user interface 418 comprises an "Energy Tracker" that presents the processed information to the consumer. The example user interface 418 includes a Historical Energy Usage chart 500 showing the consumer's current year-to-date energy consumption, last year's energy consumption for the same periods, and local average energy consumption during the same period.

The user interface 418 may also include a Current Energy Cost 502, which is calculated by the calculation module 302 of the network computing device 102 and which represents the cost to the consumer of the next kilowatt of energy. These billing and cost calculations may be the same or similar calculations to those that utilities have historically used for billing and other purposes. Performing these calculations at the network computing devices 102, rather than by an in-home device (IHD) (e.g., home energy management system), minimizes the chance of discrepancies being introduced by such IHDs, which typically are not owned or administered by the utility. Additionally or alternatively, the user interface 418 may include a Current Energy Usage 504, which indicates a current energy usage of the consumer. In the illustrated example, the current energy usage is broken down by individual appliances communicatively coupled to the HAN 402 so the consumer can see which appliances are consuming the most energy.

The user interface 418 may also include Suggestions for Energy Savings 506, which suggest ways in which the consumer can change their consumption behaviors to save money. The suggestions for energy savings may be specific to the consumer and may be based on the processed data for the consumer. For example, the suggestions may include a specific amount of money the consumer could save by operating a specific appliance on their HAN differently.

The consumer interface 418 may also include a Manage Energy Usage Profile link 508. By selecting the link 508, the consumer can view and manage their current energy usage profile. By way of example and not limitation, the energy usage profile may include one or more predefined service agreements, user preferences, and/or rules governing consumption of resources under certain conditions. For example, a consumer's service agreement may give the utility permission to regulate the consumer's energy consumption in exchange for a discounted energy rate. As another example, the consumer may be allowed to define certain conditions (e.g., price, time of day, etc.) under which to run or not run certain appliances.

User interface 418 is merely one example of many possible ways in which processed data can be presented or otherwise consumed by consumers of the processed data.

Computer Readable Media

Memory 120, 130, and 414 are examples of computer-readable media and may take the form of volatile memory, such as Random Access Memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Example Method

Figure 6:
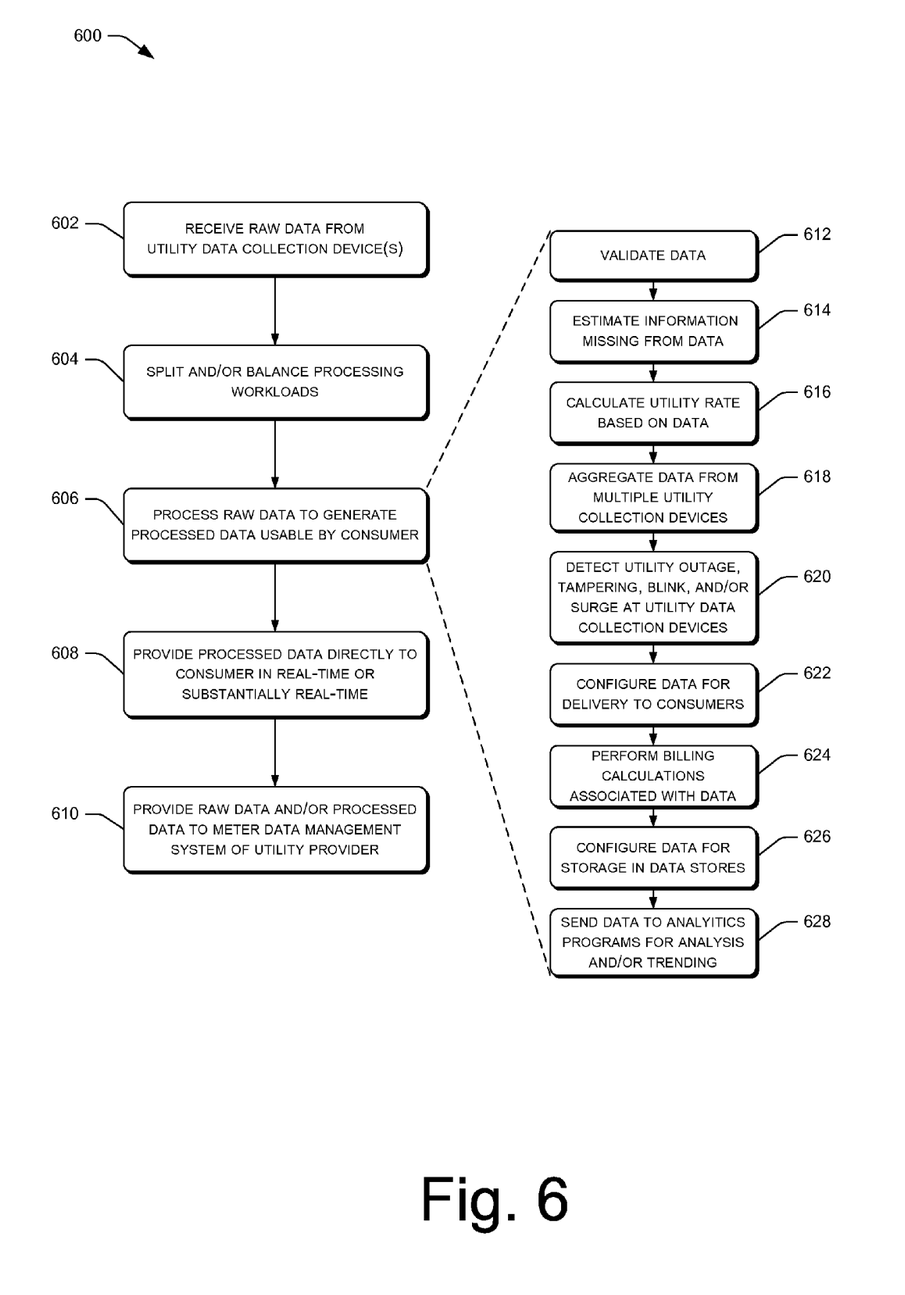
FIG. 6 is a flowchart illustrating an example distributed meter data management method.

FIG. 6 is a flowchart illustrating an example method 600 usable to implement distributed meter data management. This example method may be performed in whole or in part by one or more processors executing computer-executable instructions. Generally, computer-executable instructions can include routines, programs, objects, components, data structures, procedures, modules, functions, and the like that perform particular functions or implement particular abstract data types. The method can also be practiced in a distributed computing environment where functions are performed by remote processing devices that are linked through a communication network or a communication cloud. In a distributed computing environment, computer executable instructions may be located both in local and remote computer-readable media, including memory storage devices.

The example method 600 is illustrated as a collection of blocks in a logical flowchart representing a sequence of operations that can be implemented in hardware, software, firmware, or a combination thereof. The order in which the blocks are described is not intended to be construed as a limitation, and any number of the described operations can be combined in any order to implement the method, or alternate methods. Additionally, individual operations may be omitted from the method without departing from the spirit and scope of the subject matter described herein. In the context of software, the blocks represent computer instructions that, when executed by one or more processors, perform the recited operations.

Method 600 is described in the context of the example architectures 100 and 200 of FIG. 1 for ease of illustration, but is not limited to being performed using such architectures. Rather, method 600 may be implemented using other architectures and/or computing devices. Additionally, the example architectures and computing devices described herein may be used to perform other methods.

At 602, a network computing device, such as network computing device 102, receives raw data from one or more utility data collection devices 110, such as utility meters 112, sensors 114, and/or control devices 116. The raw data received may, in some instances, be accompanied by a date and/or time stamp, a device identifier identifying the utility collection device from which the raw data was received, or other data associated with the collected data or the circumstances under which the data was collected.

In some implementations, at 604, the routing module 122 of the network computing device 102 may split or balance processing workloads between and among the centralized MDM 136 and the distributed MDM modules 124 of the network computing devices 102. In that case, allocation of processing responsibilities between the centralized MDM 136 and the network computing devices 102 may be based on the relative processing capabilities of the devices, current or predicted workloads of the devices, network bandwidth, network traffic, transmission latency between the devices, or the like.

At 606, the network computing device 102 processes the raw data received from the utility data collection devices 110 to generate processed data usable by a consumer. The consumer may be a customer, partner, supplier, third party, or internal system of the utility, for example. At 608, the network computing device provides the processed data to the consumer directly, prior to sending any of the raw data or processed data to an office of a utility provider (e.g., central office 104). In some embodiments, the network computing device 102 may also, at 610, provide the raw data and/or the processed data to a meter data management (MDM) system in the office of the utility provider for additional processing, analysis, and/or storage. However, in other embodiments, a centralized MDM system may be dispensed with entirely.

The processing performed at 606 may vary depending on a variety of factors, including the architecture used. In various embodiments, the network computing device may at block 612 validate that the raw data is accurate; at block 614 estimate any information missing from the raw data; at block 616 perform utility rate calculations based on the raw data; at 618 aggregate raw data from multiple utility meters; at block 620 detect a utility outage, tampering, a blink, and/or a surge at one or more of the utility data collection devices; at block 622 configure the data for delivery to one or more consumers of the data; at block 624 perform billing calculations associated with the data; at block 626 configure the data for storage in one or more data stores; and/or at block 628 send the data to one or more analytics programs for analysis and/or trending. These and other processing operations may be performed by one or more data processing modules, such as those shown and described with reference to FIG. 3. Moreover, the processing workload may be distributed between and among the various network computing devices and the central office of the utility network provider.

Any of the acts of any of the methods described herein may be implemented at least partially by a processor or other electronic device based on instructions stored on one or more computer-readable media.

Conclusion

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. One or more computer-readable media storing instructions that, when executed by one or more processors, configure the one or more processors to perform acts comprising:
   receiving raw data from one or more utility meters, sensors, and/or control devices at a field-deployed utility network router;
   processing, at the field-deployed utility network router, the data received from the utility meters, sensors, and/or control devices to generate processed data usable by a consumer, the processing comprising:
   validating that the raw data is accurate;
   estimating any information missing from the raw data; and/or
   detecting a utility outage, tampering, a blink, and/or a surge at one or more of the utility meters, sensors, and/or control devices; and
   providing the processed data to the consumer directly from the field-deployed utility network router.

2. The one or more computer-readable media of claim 1, wherein processing the data further comprises:
   performing utility rate calculations based on the raw data; and/or
   aggregating raw data from multiple utility meters.

3. The one or more computer-readable media of claim 1, wherein providing the processed data to the consumer is performed prior to sending any of the raw data or processed data to an office of a utility provider.

4. The one or more computer-readable media of claim 3, further comprising providing the raw data and/or the processed data to a meter data management (MDM) system in the office of the utility provider.

5. A method comprising:
   under control of a network computing device configured with computer-executable instructions:
   receiving data from one or more utility data collection devices communicatively coupled to the network computing device;
   processing the data received from the utility data collection devices to generate processed data usable by a consumer, wherein processing the data comprises validation of the data and/or estimation of information missing from the data; and
   providing the processed data to the consumer.

6. The method of claim 5, wherein the network computing device comprises a network router.

7. The method of claim 5, wherein processing the data further comprises performing utility rate calculations based on the data and/or aggregating the data from multiple utility collection devices.

8. The method of claim 5, wherein processing the data further comprises detecting a utility outage, tampering, a blink, and/or a surge at one or more of the utility data collection devices.

9. The method of claim 5, wherein the processed data is provided to the consumer directly by the network computing device, prior to sending the data or the processed data to an office of a utility provider.

10. The method of claim 9, further comprising providing the data and/or the processed data to a meter data management (MDM) system in the office of the utility provider.

11. The method of claim 5, wherein processing the data further comprises:
   configuring the data for delivery to one or more consumers of the data;
   performing billing calculations associated with the data;
   configuring the data for storage in one or more data stores; and
   sending the data to one or more analytics programs for analysis and/or trending.

12. The method of claim 5, wherein the one or more utility data collection devices from which the network computing device receives data include water, gas, and/or electric meters.

13. The method of claim 5, wherein the one or more utility data collection devices include utility meters, sensors, and/or control devices.

14. The method of claim 5, wherein the network computing device is located in a cellular relay station, and is in communication with the utility data collection devices via a wireless local area network.

15. The method of claim 5, wherein the processed data is provided to the consumer in real time or substantially real time.

16. A network computing device comprising:
one or more processors;
memory communicatively coupled to the one or more processors;
a network interface to receive data from one or more utility data collection devices;
one or more processing modules, stored in the memory and executable on the one or more processors, to process the data received from the one or more utility data collection devices to generate processed data usable by a consumer, the one or more processing modules including a validation and estimation module, stored in the memory and executable on the one or more processors, to validate the data and/or estimate information missing from the data; and
a routing module, stored in the memory and executable on the one or more processors, to route the data and/or the processed data to one or more users of the data.

17. The network computing device of claim 16, wherein the network computing device comprises field-deployed utility network router.

18. The network computing device of claim 16, wherein the one or more processing modules further include:
a calculation module, stored in the memory and executable on the processor, to perform utility rate calculations based on the data and/or aggregating the data from multiple utility collection devices; and/or
an event processing module, stored in the memory and executable on the processor, to detect a utility outage, tampering, a blink, and/or a surge at one or more of the utility data collection devices.

19. The network computing device of claim 18, wherein the one or more processing modules further include:
a delivery module, stored in the memory and executable on the processor, to prepare the data for delivery to one or more users of the data;
a billing module, stored in the memory and executable on the processor, to perform billing calculations associated with the data; and/or
a storage module, stored in the memory and executable on the processor, to configure the data for storage in one or more data stores.

20. The network computing device of claim 16, wherein the processing module is configured to provide the processed data to the consumer directly, prior to sending the data or the processed data to an office of a utility provider.

21. The network computing device of claim 20, wherein the network interface is further configured to provide the data and/or the processed data to a meter data management (MDM) system in the office of the utility provider.

22. An advanced metering infrastructure (AMI) comprising a plurality of the network computing devices of claim 16.

\* \* \* \* \*